(12) United States Patent
Kim et al.

(10) Patent No.: US 10,203,239 B2
(45) Date of Patent: Feb. 12, 2019

(54) METHOD OF CONTROLLING AIR CONDITIONER BASED ON LEVEL OF CONDENSED WATER

(71) Applicant: LG ELECTRONICS INC., Seoul (KR)

(72) Inventors: Daehee Kim, Seoul (KR); Joonkeol Song, Seoul (KR); Sunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 603 days.

(21) Appl. No.: 14/824,594

(22) Filed: Aug. 12, 2015

(65) Prior Publication Data

US 2016/0047563 A1 Feb. 18, 2016

(30) Foreign Application Priority Data

Aug. 12, 2014 (KR) .................. 10-2014-0104194

(51) Int. Cl.
*F25D 21/00* (2006.01)
*G01F 23/26* (2006.01)
(Continued)

(52) U.S. Cl.
CPC ............ *G01F 23/263* (2013.01); *F24F 11/30* (2018.01); *F24F 11/89* (2018.01); *F24F 13/222* (2013.01);
(Continued)

(58) Field of Classification Search
CPC .......... F24F 11/001; F24F 11/89; F24F 11/30; F24F 11/222; F24F 2110/00; F24F 2140/30; G01F 23/263
See application file for complete search history.

(56) References Cited

U.S. PATENT DOCUMENTS 3,343,415 A * 9/1967 Johnston ............... G01F 23/263
73/304 C
3,873,927 A * 3/1975 Overall .................. G01W 1/00
307/116
(Continued)

FOREIGN PATENT DOCUMENTS

EP    1 943 902 A1    7/2008
EP    2 085 711 A1    8/2009
(Continued)

OTHER PUBLICATIONS

European Search Report dated Jan. 25, 2016 issued in Application No. 15180631.2.
(Continued)

*Primary Examiner* — Ljiljana Ciric
(74) *Attorney, Agent, or Firm* — Ked & Associates LLP

(57) ABSTRACT

A method of controlling an air conditioner includes a step of sensing the capacitance of condensed water through a plurality of electrode pads to sense the level of condensed water stored in a condensed water storage part during cooling, a step of sensing an increase in the level of condensed water and calculating an amount of condensed water that is generated per unit time based on the sensed increase in the level of condensed water, a step of comparing the sensed level of the condensed water with a drainage level stored in a memory, and a step of operating a drainage pump based on the sensed level of condensed water or the calculated amount of condensed water that is generated per unit time.

11 Claims, 11 Drawing Sheets

(51) Int. Cl.
*F24F 13/22* (2006.01)
*F24F 11/30* (2018.01)
*F24F 11/89* (2018.01)
*F24F 110/00* (2018.01)
*F24F 140/30* (2018.01)

(52) U.S. Cl.
CPC ....... *F24F 2110/00* (2018.01); *F24F 2140/30* (2018.01)

(56) References Cited

U.S. PATENT DOCUMENTS

| | | | | |
|---|---|---|---|---|
| 3,882,381 | A * | 5/1975 | Gregory | G01W 1/00 324/665 |
| 3,986,110 | A * | 10/1976 | Overall | G01B 7/085 73/304 C |
| 4,058,765 | A * | 11/1977 | Richardson | G01D 5/2405 241/37 |
| 4,115,877 | A * | 9/1978 | Wall | E04H 4/12 210/167.12 |
| 4,135,151 | A * | 1/1979 | Rogers | G01R 27/02 324/664 |
| 4,145,927 | A * | 3/1979 | Larson | G01F 23/263 73/304 C |
| 4,174,498 | A * | 11/1979 | Preikschat | G01N 27/223 324/651 |
| 4,204,427 | A * | 5/1980 | Gothe | G01F 23/263 324/665 |
| D256,787 | S * | 9/1980 | Petersen | D10/106.5 |
| 4,258,422 | A * | 3/1981 | Dougherty | G01F 23/263 701/123 |
| 4,281,286 | A * | 7/1981 | Briggs | G01N 27/223 324/667 |
| 4,288,742 | A * | 9/1981 | Walsh | G01R 27/26 324/666 |
| 4,337,638 | A * | 7/1982 | Leonard | G01F 23/263 702/108 |
| 4,344,293 | A * | 8/1982 | Fujiwara | B60H 1/3225 331/143 |
| 4,350,039 | A * | 9/1982 | van Dyke | G01F 23/263 73/304 C |
| 4,352,159 | A * | 9/1982 | Colby | G01F 23/263 340/618 |
| 4,355,363 | A * | 10/1982 | Colby | G01F 23/263 340/618 |
| 4,363,239 | A * | 12/1982 | Fahley | G01F 23/263 73/304 C |
| 4,373,390 | A * | 2/1983 | van Dyke | G01F 23/263 73/304 C |
| 4,388,828 | A * | 6/1983 | Dougherty | G01F 23/263 702/52 |
| 4,389,900 | A * | 6/1983 | Gutierrez | G01F 1/00 361/285 |
| 4,479,116 | A * | 10/1984 | Kobayashi | G01N 27/223 340/620 |
| 4,495,560 | A * | 1/1985 | Sugimoto | B60H 1/00814 700/34 |
| 4,510,436 | A * | 4/1985 | Raymond | G01R 27/2635 324/672 |
| 4,603,581 | A * | 8/1986 | Yamanoue | G01F 23/268 340/620 |
| 4,745,893 | A * | 5/1988 | Atherton | G01F 23/263 123/196 S |
| 4,765,187 | A * | 8/1988 | Weinstein | G01B 7/06 73/290 R |
| 4,766,369 | A * | 8/1988 | Weinstein | B64D 15/20 244/134 F |
| 4,789,822 | A * | 12/1988 | Ohmatoi | G01D 3/036 324/685 |
| 4,805,070 | A * | 2/1989 | Koontz | B32B 17/10 361/286 |
| 4,818,492 | A * | 4/1989 | Shimizu | G01F 23/263 422/509 |
| 4,897,597 | A * | 1/1990 | Whitener | G01N 27/048 324/693 |
| 4,943,889 | A * | 7/1990 | Ohmatoi | G01B 7/023 361/284 |
| 4,970,468 | A * | 11/1990 | Ishizawa | G01F 23/263 324/662 |
| 4,982,606 | A * | 1/1991 | Adamski | D06F 39/087 137/387 |
| 5,012,683 | A * | 5/1991 | Davis | G01F 23/263 73/290 R |
| 5,040,411 | A * | 8/1991 | Medzius | B32B 17/10036 361/286 |
| 5,477,727 | A * | 12/1995 | Koga | G01F 23/263 361/284 |
| 5,598,971 | A * | 2/1997 | Winther | B01F 3/04021 236/44 A |
| 5,965,814 | A | 10/1999 | French et al. | |
| 6,078,729 | A * | 6/2000 | Kopel | F22B 1/284 392/324 |
| 8,810,260 | B1 * | 8/2014 | Zhou | G01N 27/226 324/658 |
| 9,297,686 | B1 * | 3/2016 | Ross, Jr. | G01F 23/292 |
| 9,574,928 | B2 * | 2/2017 | Periyathamby | G01F 23/268 |
| 9,921,095 | B2 * | 3/2018 | Tichborne | G01F 23/266 |
| 9,943,116 | B2 * | 4/2018 | Cameron | F24F 11/30 |
| 10,082,414 | B2 * | 9/2018 | Ge | G01F 23/263 |
| 2002/0017131 | A1 * | 2/2002 | Neuhaus | G01F 23/00 73/304 C |
| 2004/0149032 | A1 * | 8/2004 | Sell | G01F 23/263 73/304 C |
| 2005/0172712 | A1 * | 8/2005 | Nyce | G01F 23/263 73/304 C |
| 2006/0053880 | A1 * | 3/2006 | Taylor | G01F 23/0069 73/304 C |
| 2008/0202745 | A1 * | 8/2008 | Levy | E21B 47/042 166/250.03 |
| 2008/0229819 | A1 * | 9/2008 | Mayleben | F04B 49/06 73/304 C |
| 2010/0064705 | A1 | 3/2010 | Chauvin et al. | |
| 2010/0295565 | A1 * | 11/2010 | Drack | G01F 23/243 324/693 |
| 2013/0248525 | A1 * | 9/2013 | Kataoka | B60K 15/03 220/4.14 |
| 2013/0297235 | A1 * | 11/2013 | Oldfield | G01F 23/263 702/55 |
| 2014/0352428 | A1 * | 12/2014 | Kato | G01F 23/263 73/304 C |
| 2015/0040311 | A1 * | 2/2015 | Hennings | E03B 1/042 4/668 |
| 2015/0253174 | A1 * | 9/2015 | Barrett | G01F 23/263 73/304 C |
| 2015/0346017 | A1 * | 12/2015 | LePort | G01N 33/2823 250/577 |
| 2016/0003663 | A1 * | 1/2016 | Miatton | G01F 23/263 73/304 C |
| 2016/0114590 | A1 * | 4/2016 | Arpin | B41J 2/175 347/7 |
| 2016/0146656 | A1 * | 5/2016 | Hoppe | G01F 23/263 73/304 C |
| 2016/0195287 | A1 * | 7/2016 | Shirali | A47J 39/006 700/282 |
| 2017/0320576 | A1 * | 11/2017 | Hennings | G01F 23/268 |

FOREIGN PATENT DOCUMENTS

| | | |
|---|---|---|
| JP | 07-103805 A | 4/1995 |
| JP | H08-105635 | 4/1996 |
| JP | 2007-237068 | 9/2007 |
| JP | 2007-253137 | 10/2007 |
| KR | 10-0920218 B1 | 10/2009 |
| KR | 10-1351024 B1 | 1/2014 |

OTHER PUBLICATIONS

Korean Office Action dated Jan. 28, 2016 issued in Application No. 10-2014-0104194.

(56) References Cited

OTHER PUBLICATIONS

Korean Office Action dated Jul. 5, 2016 issued in Application No. 10-2014-0104194.

* cited by examiner

METHOD OF CONTROLLING AIR CONDITIONER BASED ON LEVEL OF CONDENSED WATER

CROSS-REFERENCE TO RELATED APPLICATION

This application claims priority under 35 U.S.C. § 119 to Korean Application No. 10-2014-0104194, filed on Aug. 12, 2014 in the Korean Intellectual Property Office, whose entire disclosure is hereby incorporated by reference.

BACKGROUND

1. Field

The present disclosure relates to an air conditioner.

2. Background

In general, an air conditioner includes a drainage pump for discharging condensed water, generated during the operation of the air conditioner, out of the air conditioner. A water level sensing device for sensing the level of the condensed water is installed in the air conditioner.

A water level sensing device installed in a general air conditioner is disposed in a drainage tank for storing condensed water. As a result, the water level sensing device directly contacts the condensed water. The water level sensing device is configured such that a float moves upward or downward according to the level of the condensed water, and a magnetic sensor senses the magnetic force of the float when the float moves upward to a predetermined height or higher.

Since the water level sensing device installed in the general air conditioner directly contacts the condensed water as described above, foreign matter may be attached to the float. In the water level sensing device installed in the general air conditioner, the float may malfunction due to the foreign matter attached to the float. The general air conditioner is configured such that the magnetic sensor senses the float when the float moves upward to a predetermined height. The magnetic sensor senses only that the condensed water has reached a predetermined height or higher. If the condensed water does not reach the predetermined height, it is not possible to discharge the condensed water out of the air conditioner. An example of a general air conditioner is disclosed, for example, in Korean Registered Patent No. 10-1351024.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
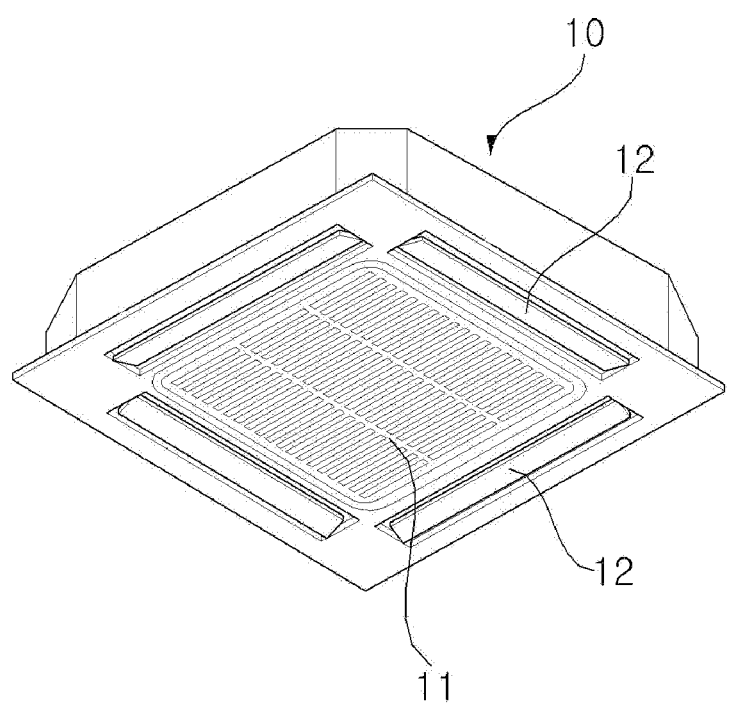
FIG. 1 is a perspective view showing an air conditioner according to a first embodiment of the present disclosure.
Figure 2:
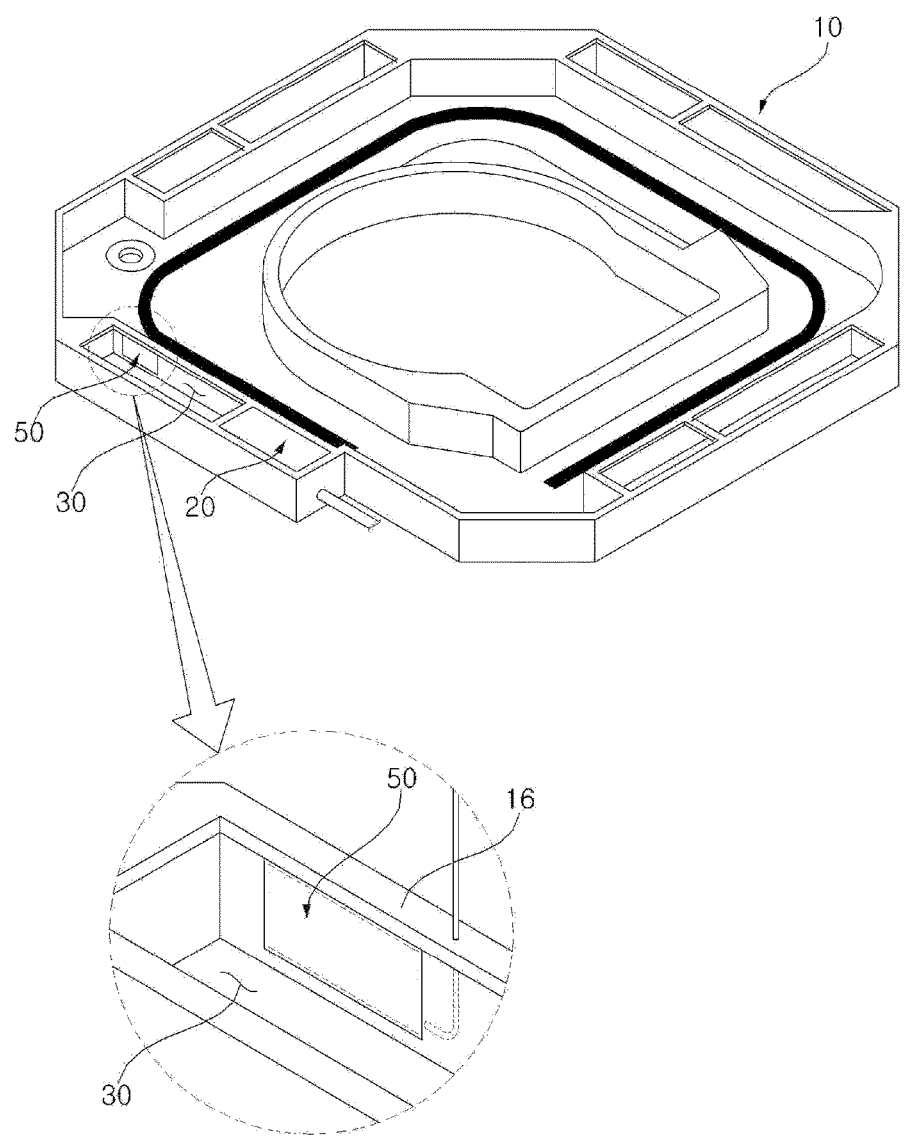
FIG. 2 is a perspective view showing the air conditioner of FIG. 1 in which a water level detecting device is installed.

An air conditioner according to a first embodiment of the present disclosure will be described with reference to FIGS. 1 to 4. The air conditioner according to this embodiment is a ceiling type air conditioner. The ceiling type air conditioner includes an indoor unit and an outdoor unit. The indoor unit may be variously configured based on where and how the air conditioner is installed and the present disclosure is applicable to other types of air conditioners.

The indoor unit according to this embodiment is installed in the ceiling of a room such that the lower surface of the indoor unit is exposed in the room. The indoor unit includes a case 10 forming the external appearance of the indoor unit. The case 10 is provided at the lower surface thereof with an inlet port 11 and an output port 12.

An indoor heat exchanger, an indoor blower, a drainage pump 20, etc. may be disposed in the case 10. A condensed water storage part or chamber 30 for storing condensed water generated by the indoor heat exchanger is formed in the case 10. In this embodiment, the condensed water storage part 30 is formed integrally with the case 10. Alternatively, the condensed water storage part 30 may be manufactured separately from the case 10.

A water level sensor or sensing device 50 for sensing the level of condensed water stored in the condensed water storage part 30 is disposed in the case 10. The water level sensing device 50 does not directly contact the condensed water. The water level sensing device 50 may be disposed outside the condensed water storage part 30 or in a frame defining the condensed water storage part 30. In this embodiment, the water level sensing device 50 may be inserted in a condensed water storage partition wall 16 defining the condensed water storage part 30. As a result, the water level sensing device 50 does not contact the condensed water.

In this embodiment, the water level sensing device 50 senses the level of condensed water using capacitance. In general, when an electric potential is applied to a conductor, the conductor is charged with electric charges. This effect may be more clearly observed when two or more different electric potentials are applied to two or more conductors (voltages are applied to two or more conductors) than when an electric potential is applied to a single conductor.

A capacitive sensor is a sensor that quantifies capacitance using this charging effect. In this embodiment, the capacitive sensor senses that the capacitance varies depending upon the level of condensed water stored in the condensed water storage part 30. The operation and construction of the capacitive sensor are known to one of ordinary skill in the art, and a detailed description thereof may be omitted.

Figure 3:
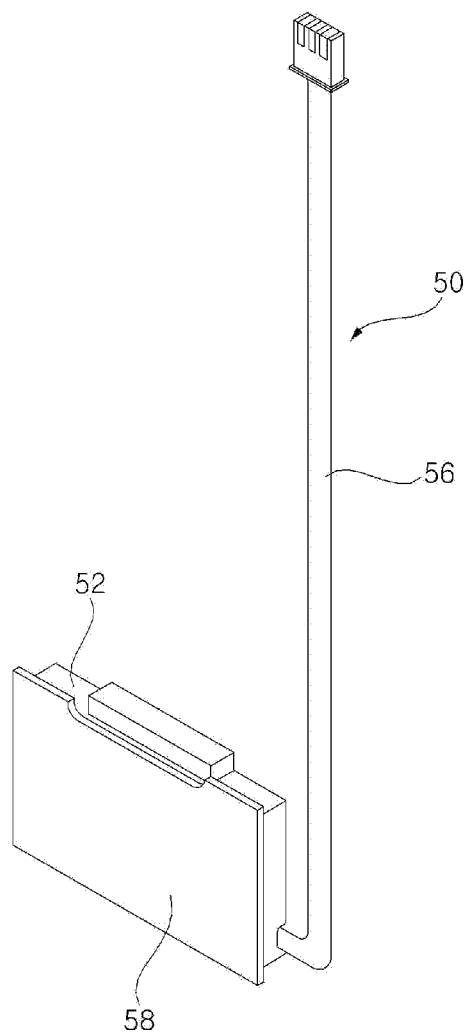
FIG. 3 is a perspective view of the water level detecting device shown in FIG. 2.
Figure 4:
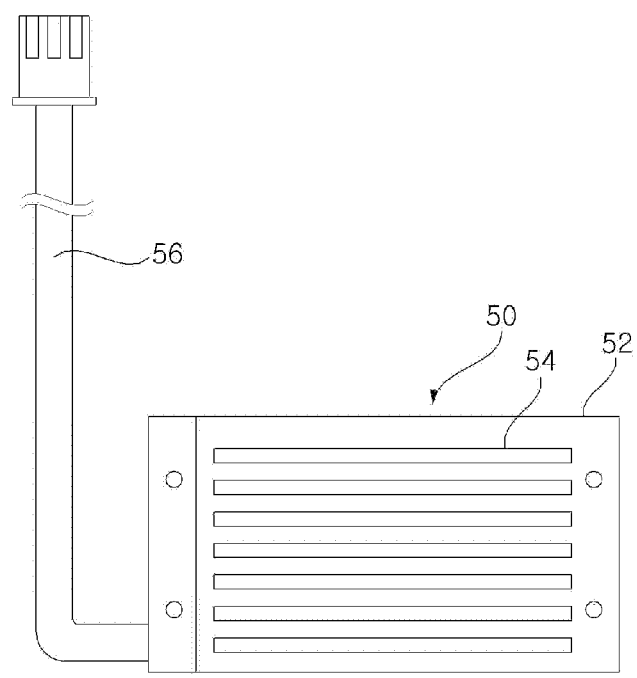
FIG. 4 is a front view of FIG. 3.

As shown in FIGS. 3 and 4, the water level sensing device 50 is configured in the form of a printed circuit board assembly (PCBA). The water level sensing device 50 includes a printed circuit board 52 disposed in the condensed water partition wall 16 in a state of not contacting the condensed water, a plurality of electrode pads, electrode lines or electrode plates 54 disposed on the printed circuit board 52, and a connector 56 for electrically connecting the printed circuit board 52 to a controller of the air conditioner.

The electrode pads 54 may be a sensor that senses the capacitance of the condensed water. A plurality of electrode pads 54 is disposed on the printed circuit board 52. Each of the electrode pads 54 extends in a lateral direction of the printed circuit board 52. The electrode pads 54 are disposed on the printed circuit board 52 such that the electrode pads 54 are spaced apart from each other in a vertical direction.

The water level sensing device 50 may further include a water level cover 58, which covers the printed circuit board 52. The water level cover 58 is installed after the printed circuit board 52 is inserted into the condensed water storage partition wall 16. The water level cover 58 prevents the printed circuit board 52 from contacting the condensed water. In this embodiment, the water level cover 58 is used, since the printed circuit board 52 is installed inside the condensed water storage part 30. Alternatively, the water level cover 58 may not be installed in a case in which the printed circuit board 52 may be installed outside the condensed water storage part 30.

The water level cover 58 is assembled to the condensed water storage partition wall 16 for preventing the printed circuit board 52 from physically contacting the condensed water. At the edge of the water level cover 58 may be disposed a packing or a seal ring for preventing the condensed water from permeating inside. The connector 56 is installed through the condensed water partition wall 16 and is connected to the controller of the air conditioner, which determines a water level value based on condensed water in the storage part 50.

Figure 5:
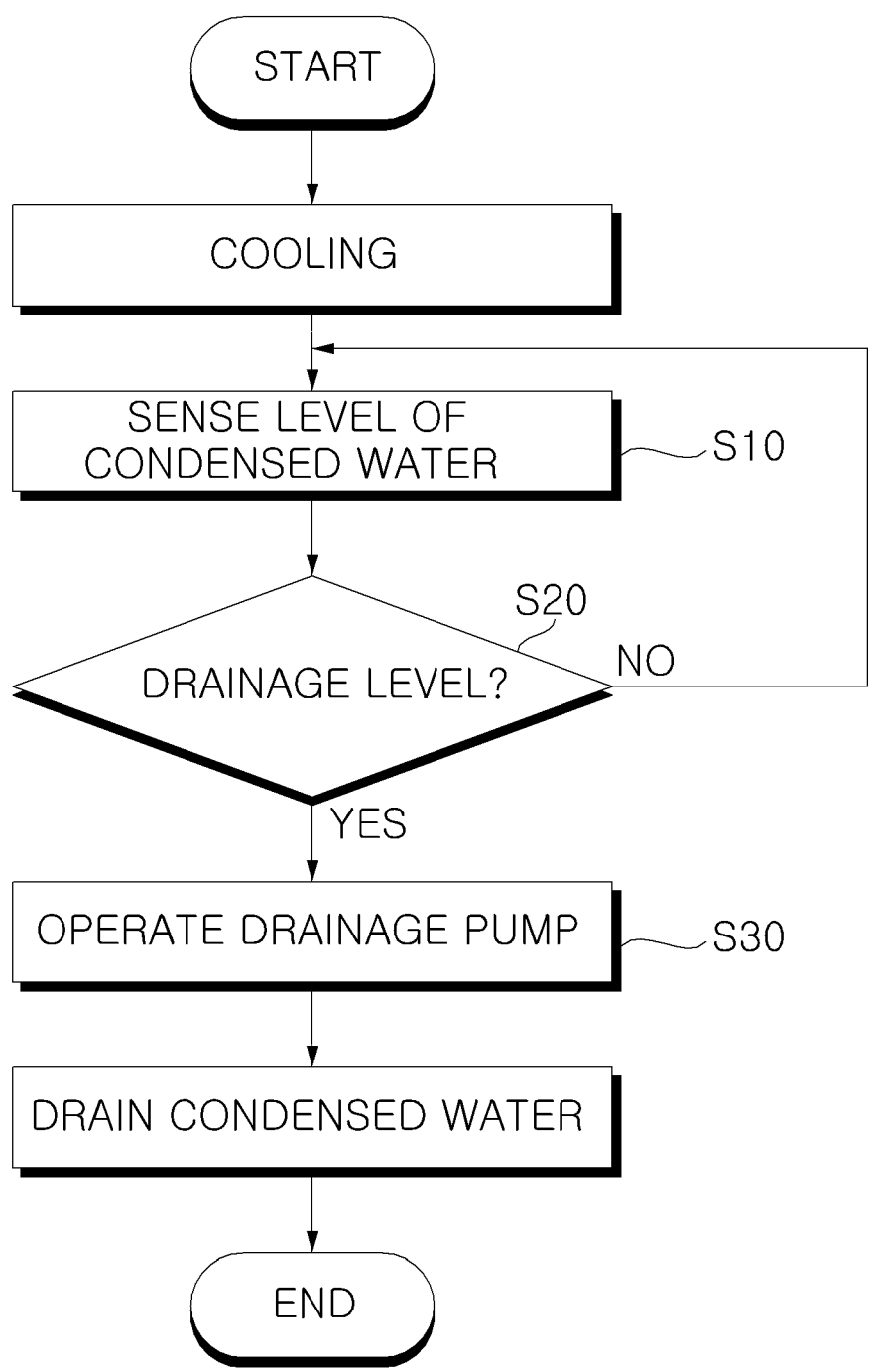
FIG. 5 is a flowchart showing a method of controlling an air conditioner according to a first embodiment of the present disclosure.

FIG. 5 is a flowchart showing a method of controlling an air conditioner according to a first embodiment of the present disclosure. In the method of controlling the air conditioner according to this embodiment, the water level sensing device 50, which includes the electrode pads 54, may accurately sense the level of condensed water to control the drainage pump 20.

The method of controlling the air conditioner according to this embodiment includes a step of sensing the level of condensed water stored in the condensed water storage part 30 during cooling (S10), a step of comparing the sensed level of the condensed water with a reference drainage level stored in a memory (S20), and a step of operating the drainage pump 20 (S30) upon determining that the sensed level of the condensed water is within an error range of the drainage level. Upon determining at step S20 that the sensed level of the condensed water deviates from the error range of the drainage level, the procedure returns to step S10.

When a float switch is used, the drainage pump 20 is not operated even when the condensed water very closely approaches the float switch. However, in a case in which the level of the condensed water is accurately sensed using the electrode pads 54, the sensed level of the condensed water is compared with the drainage level, and the drainage pump 20 is operated based on the error range of the drainage level even when the level of the condensed water does not reach the drainage level. Therefore, the air conditioner according to this embodiment may use the condensed water storage part 30 more effectively.

In a general air conditioner, the drainage pump 20 is operated based on the maximum amount of condensed water that is generated in order to prevent the overflow of condensed water. As a result, the general air conditioner has problems in that noise and power consumption are increased due to the operation of the drainage pump 20.

For example, in a case in which the level of condensed water is sensed every 10 minutes as in the background art, the condensed water storage part 30 must have a sufficient space to store condensed water for 10 minutes. In the general air conditioner, the condensed water storage part 30 must have an empty space equivalent to the maximum amount of condensed water that can be generated for 10 minutes. In the general air conditioner, therefore, the float switch senses the level of condensed water in a state in which the condensed water storage part 30 has an empty space equivalent to the maximum amount of condensed water, and then the drainage pump is operated in order to prevent the overflow of condensed water.

In a case in which the level of condensed water is sensed through the sensing of capacitance using the electrode pads as in this embodiment, it is possible to control the operating interval of the drainage pump 20 based on the amount of condensed water that is currently generated.

For example, the amount of condensed water that is generated is small when humidity is low, and the amount of condensed water that is generated is large when humidity is high. In a case in which the amount of condensed water that is generated is small, the operating interval of the drainage pump 20 may be controlled to be increased, e.g., less frequency of turning on the discharge pump. In a case in which the amount of condensed water that is generated is large, the operating interval of the drainage pump 20 may be controlled to be decreased, e.g., greater frequency of turning on the discharge pump. It is possible to optimize operating noise and power consumption through the control of the operating interval of the drainage pump 20.

In addition, since the water level sensing device 50 according to this embodiment senses the level of condensed water in a state of not contacting the condensed water, contact between the water level sensing device 50 and foreign matter, such as dust or debris, floating in the condensed water is fundamentally prevented. As a result, the water level sensing device 50 does not malfunction due to foreign matter contained in the condensed water unlike the general air conditioner. Further, since the water level sensing device 50 according to this embodiment is embodied by an electrical circuit, the controller may perform fault diagnosis on itself or self-diagnostics, and may easily inform a user of internal faults.

Figure 6:
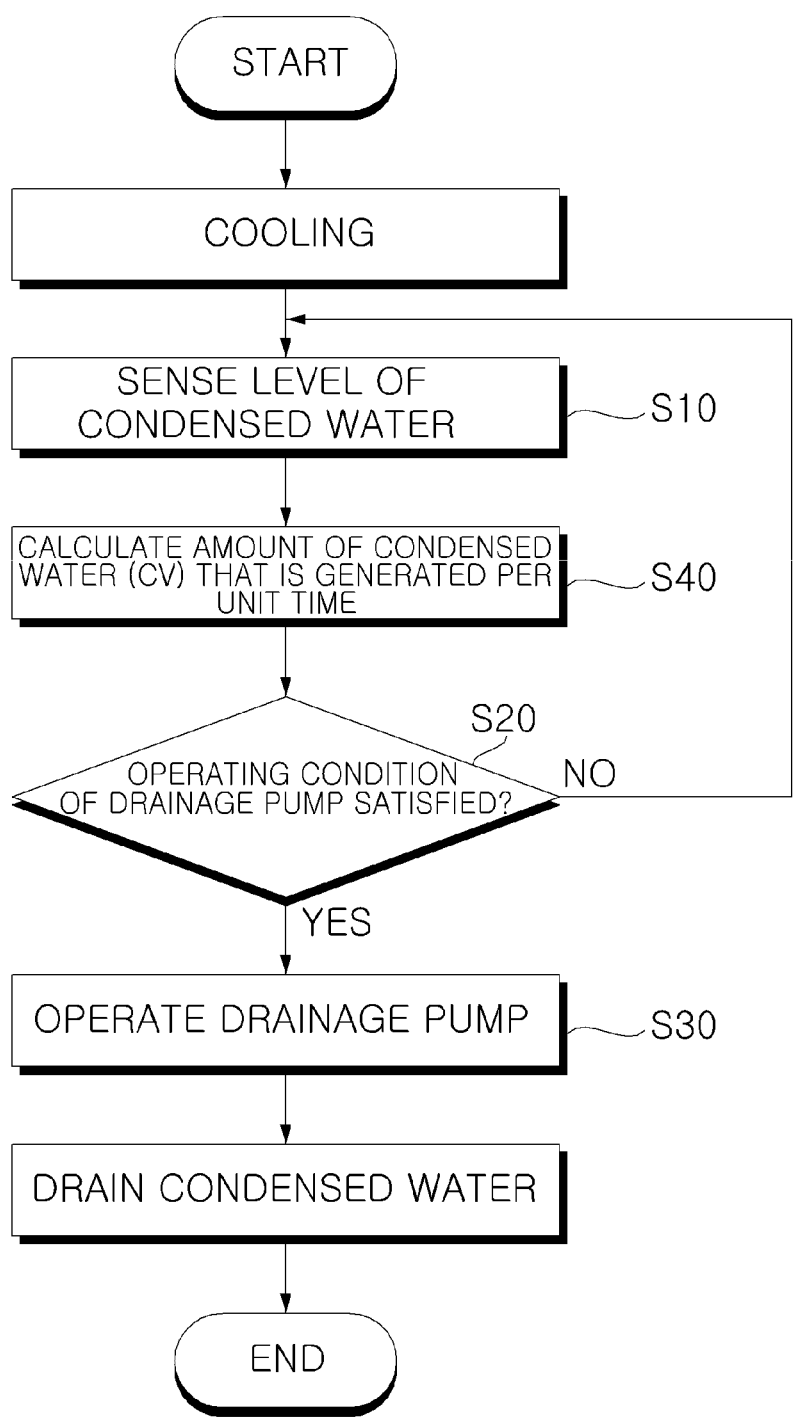
FIG. 6 is a flowchart showing a method of controlling an air conditioner according to a second embodiment of the present disclosure.

FIG. 6 is a flowchart showing a method of controlling an air conditioner according to a second embodiment of the present disclosure. In the method of controlling the air conditioner according to this embodiment, the amount of condensed water that is generated per unit time is calculated, and the drainage pump 20 is controlled using the same.

The method of controlling the air conditioner according to this embodiment includes a step of sensing the level of condensed water stored in the condensed water storage part 30 during cooling (S10), a step of sensing the increase in the level of condensed water during a predetermined time based on the level of the condensed water sensed at step S10 and calculating the amount of condensed water (CV) that is generated per unit time based thereupon (S40), and a step of determining whether an operating condition of the drainage pump 20 is satisfied based on the amount of condensed water (CV) that is generated per unit time calculated at step S40 (S50).

Upon determining at step S50 that the operating condition of the drainage pump 20 is satisfied, the drainage pump 20 is operated (S30). Upon determining at step S50 that the operating condition of the drainage pump 20 is not satisfied, on the other hand, the procedure returns to step S10.

In this embodiment, the amount of condensed water (CV) that is generated in the condensed water storage part 30 per unit time is calculated. Alternatively, the height of condensed water that is generated per unit time or the speed of condensed water that is generated per unit time may be calculated.

The height of condensed water that is generated per unit time may be the height of condensed water that is stored in the condensed water storage part 30 until the upper one of the electrode pads 54 senses the condensed water after any one of the electrode pads 54 senses the condensed water. The distance between the respective electrode pads 54 may be a constant value or constant distance. Alternatively, the distances may be variable values.

The speed of condensed water that is generated per unit time may be calculated by dividing the distance between the respective electrode pads 54 by the time taken to generate the condensed water. It is possible to sense the flow rate, volume, speed, height, etc. of the condensed water using the time during which the condensed water is sensed by the electrode pads 54.

At step S50, the operating condition of the drainage pump may be set variously. For example, the operating condition of the drainage pump may include the flow rate, volume, speed, and height of the condensed water that is generated. The other constructions of this embodiment are similar to those of the first embodiment, and therefore a detailed description thereof will be omitted.

Figure 7:
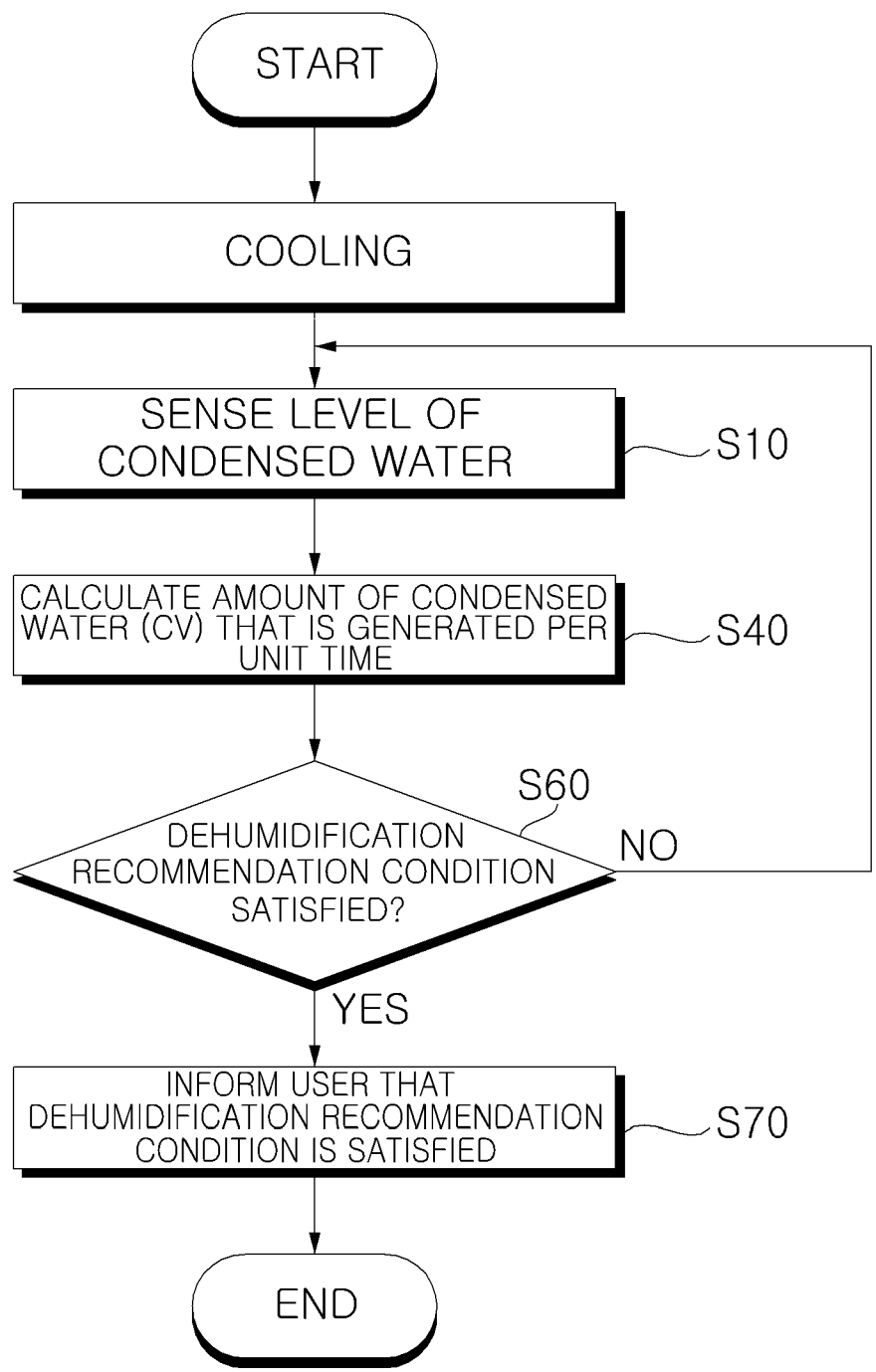
FIG. 7 is a flowchart showing a method of controlling an air conditioner according to a third embodiment of the present disclosure.

FIG. 7 is a flowchart showing a method of controlling an air conditioner according to a third embodiment of the present disclosure. In the method of controlling the air conditioner according to this embodiment, a specific mode is presented to a user based on the amount of condensed water that is generated per unit time.

The method of controlling the air conditioner according to this embodiment includes a step of sensing the level of condensed water stored in the condensed water storage part 30 during cooling (S10), a step of sensing the increase in the level of condensed water during a predetermined time based on the level of the condensed water sensed at step S10 and calculating the amount of condensed water (CV) that is generated per unit time based thereupon (S40), and a step of determining whether a dehumidification recommendation condition is satisfied based on the amount of condensed water that is generated per unit time (S60).

Upon determining that the dehumidification recommendation condition is satisfied, a user is informed thereof (S70). Upon determining that the dehumidification recommendation condition is not satisfied, on the other hand, the procedure returns to step S10.

At step S60, the amount of condensed water that is generated per unit time is compared with a reference value (SV) stored in the controller. In a case in which, at step S60, the amount of condensed water (CV) that is generated per unit time is equal to or greater than the reference value (SV), it is determined that the humidity of the room is high, and therefore condensed water is excessively generated.

Upon determining at step S60 that the dehumidification recommendation condition is satisfied, the user may be informed thereof through a display unit or a remote controller of the indoor unit of the air conditioner or using sound output from the indoor unit of the air conditioner at step S70.

In a case in which the dehumidification recommendation condition is satisfied, a process of comparing the room temperature with a target temperature may be further executed. In a case in which the dehumidification recommendation condition is satisfied, step S70 may be executed when the temperature difference between the room temperature and the target temperature is within a predetermined range.

In a case in which the temperature difference between the room temperature and the target temperature is small, the user may be prompted to operate the air conditioner in a dehumidification mode instead of room cooling in order to save electricity and more effectively remove humidity from the air.

Meanwhile, the amount of condensed water (CV) that is generated per unit time and the reference value (SV) may be set variously as the flow rate, volume, speed, height, etc. of the condensed water, as described with reference to the second embodiment. The other constructions of this embodiment are similar to those of the second embodiment, and therefore a detailed description thereof will be omitted.

Figure 8:
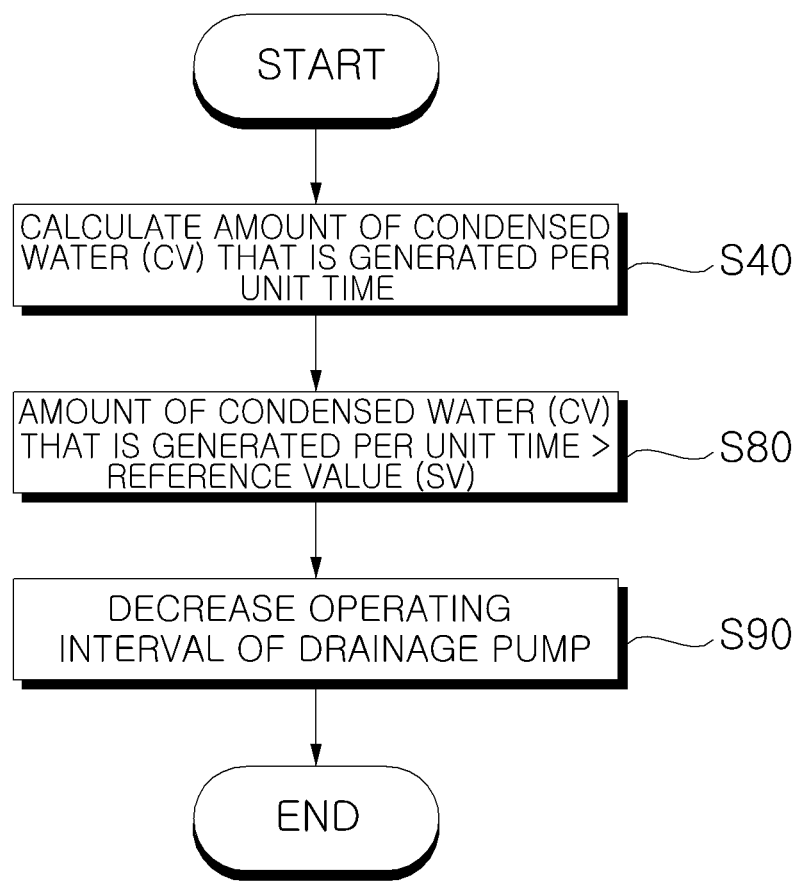
FIG. 8 is a flowchart showing a method of controlling an air conditioner according to a fourth embodiment of the present disclosure.

FIG. 8 is a flowchart showing a method of controlling an air conditioner according to a fourth embodiment of the present disclosure. In the method of controlling the air conditioner according to this embodiment, the operating interval of the drainage pump is adjusted based on the amount of condensed water (CV) that is generated.

The method of controlling the air conditioner according to this embodiment includes a step of sensing the increase in the level of condensed water during a predetermined time and calculating the amount of condensed water (CV) that is generated per unit time based thereupon (S40), a step of comparing the amount of condensed water that is generated per unit time with a reference value (SV) (S80), and a step of, upon determining that the amount of condensed water that is generated per unit time is greater than the reference value (SV), actively decreasing the operating interval of the drainage pump 20 (S90).

In a case in which, at step S80, the amount of condensed water (CV) that is generated per unit time is greater than the reference value, it is determined that the humidity of the room air is high. Upon determining that the humidity of the room air is high, the operating interval of the drainage pump 20 may be actively decreased such that the drainage pump 20 can be operated more frequently in order to effectively discharge condensed water.

Even in a case in which it is determined at step S80 that the humidity of the room air is high, the operating interval of the drainage pump 20 may be actively increased. For example, in a case in which condensed water is stored in the condensed water storage part 30 until the condensed water storage part 30 is filled with the condensed water, and then all of the stored condensed water is discharged from the condensed water storage part 30, the operating interval of the drainage pump 20 may be increased.

In this case, however, the sensing cycle at step S40 may be decreased in order to prevent the overflow of condensed water. In a case in which the amount of condensed water (CV) that is generated per unit time is greater than the reference value (SV), therefore, it may be determined that the humidity of the room air is high, and the sensing cycle in which the condensed water is sensed may be decreased in order to prevent the overflow of the condensed water.

In a case in which condensed water is stored in the condensed water storage part 30 until the condensed water storage part 30 is almost filled with the condensed water, and then the drainage pump 20 is operated, the operating interval of the drainage pump 20 may be increased. In a case in which the operating interval of the drainage pump 20 is increased, operating noise is decreased. The other constructions of this embodiment are similar to those of the second or third embodiment, and therefore a detailed description thereof will be omitted.

Figure 9:
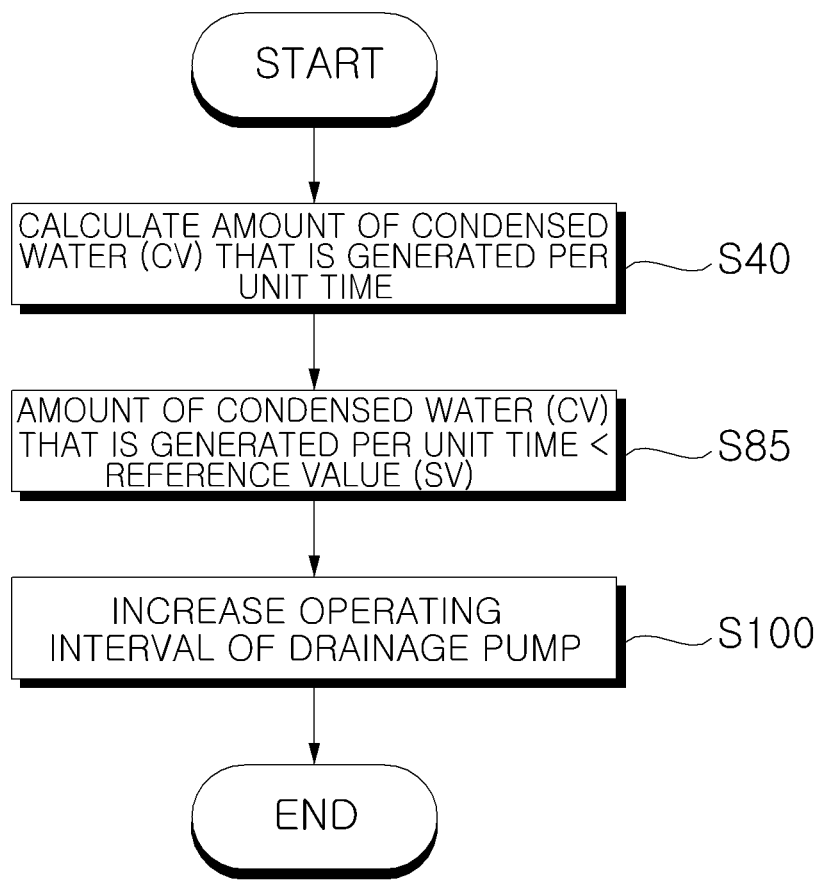
FIG. 9 is a flowchart showing a method of controlling an air conditioner according to a fifth embodiment of the present disclosure.

FIG. 9 is a flowchart showing a method of controlling an air conditioner according to a fifth embodiment of the present disclosure. In the method of controlling the air conditioner according to this embodiment, the operating interval of the drainage pump 20 is adjusted when the room humidity is low, unlike the fourth embodiment.

The method of controlling the air conditioner according to this embodiment includes a step of sensing the increase in the level of condensed water during a predetermined time and calculating the amount of condensed water (CV) that is generated per unit time based thereupon (S40), a step of comparing the amount of condensed water (CV) that is generated per unit time with a reference value (SV) (S85), and a step of, upon determining that the amount of condensed water (CV) that is generated per unit time is less than the reference value (SV), increasing the operating interval of the drainage pump 20 (S90). In a case in which the operating interval of the drainage pump 20 is increased, operating noise may be decreased, and power consumption may be reduced.

The air conditioner is operated based on the surrounding environment. For this reason, if the air conditioner is not set differently based on the humidity and temperature of a place where the air conditioner is to be installed at the time of delivery from a factory, the user's satisfaction may be lowered. In the method of controlling the air conditioner according to this embodiment, it is possible to adjust the operating interval of the drainage pump 20 based on conditions, such as humidity and temperature, of the surrounding environment. The other constructions of this embodiment are similar to those of the fourth embodiment, and therefore a detailed description thereof will be omitted.

Figure 10:
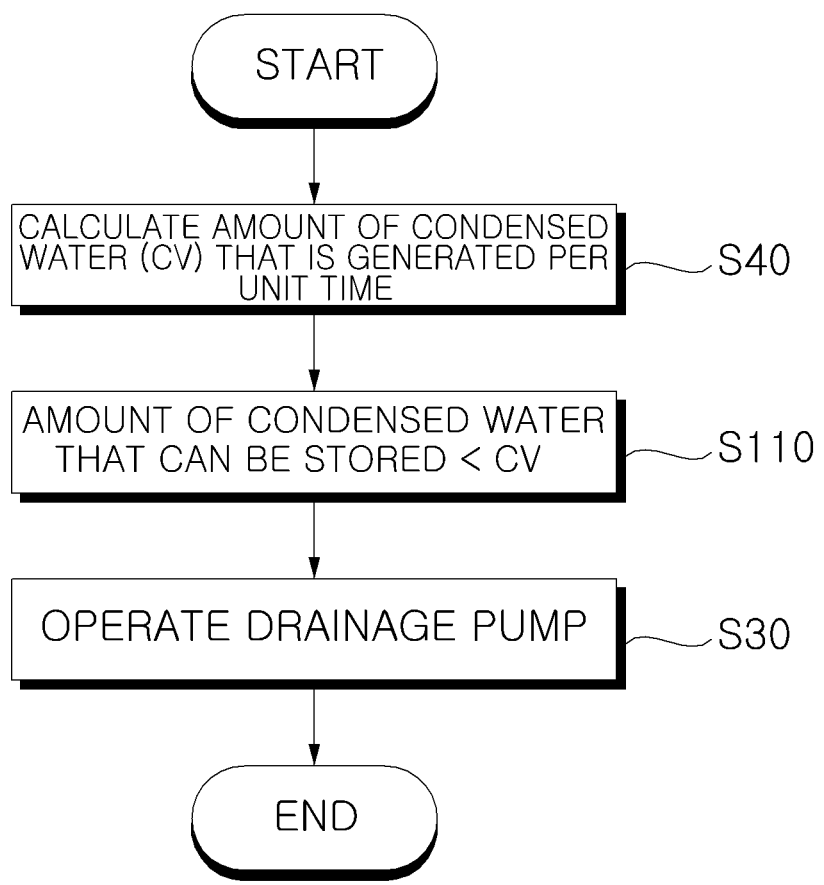
FIG. 10 is a flowchart showing a method of controlling an air conditioner according to a sixth embodiment of the present disclosure.

FIG. 10 is a flowchart showing a method of controlling an air conditioner according to a sixth embodiment of the present disclosure. In the method of controlling the air conditioner according to this embodiment, the amount of condensed water (CV) that is generated per unit time is adjusted in order to prevent the overflow of the condensed water. In this embodiment, the condensed water storage part 30 is utilized to the maximum in order to minimize the operation of the drainage pump 20, thereby reducing operating noise and power consumption.

The method of controlling the air conditioner according to this embodiment includes a step of sensing the increase in the level of condensed water during a predetermined time and calculating the amount of condensed water (CV) that is generated per unit time based thereupon (S40), a step of comparing the amount of condensed water that is generated per unit time with the amount of condensed water that can be stored (S110), and a step of, upon determining that the amount of condensed water that is generated per unit time is greater than the amount of condensed water that can be stored, operating the drainage pump 20 (S30).

The amount of condensed water that can be stored may be calculated by subtracting the current water level from the maximum water level. The amount of condensed water that can be stored may be calculated since the electrode pads are installed, as in this embodiment. Determining at step S110 that the amount of condensed water that can be stored is less than the amount of condensed water that is generated per unit time, the drainage pump 20 is operated in order to prevent the overflow of the condensed water.

The steps of calculating the amount of condensed water that can be stored and controlling the drainage pump 20 based thereupon are executed during the operation of the air conditioner. When the operation of the air conditioner is finished, the drainage pump 20 is operated to drain all of the condensed water stored in the condensed water storage part. The other constructions of this embodiment are similar to those of the second embodiment, and therefore a detailed description thereof will be omitted.

Figure 11:
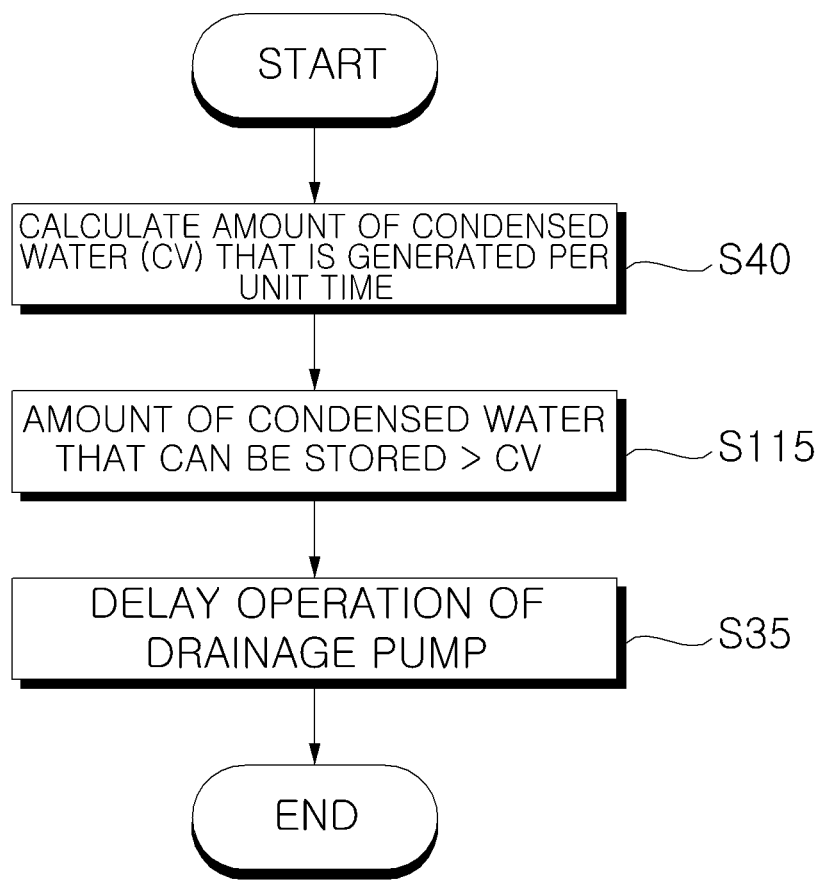
FIG. 11 is a flowchart showing a method of controlling an air conditioner according to a seventh embodiment of the present disclosure.

FIG. 11 is a flowchart showing a method of controlling an air conditioner according to a seventh embodiment of the present disclosure. In the method of controlling the air conditioner according to this embodiment, the drainage pump is controlled such that the operation of the drainage pump is delayed in a case in which the amount of condensed water that can be stored is sufficient, unlike the sixth embodiment.

The method of controlling the air conditioner according to this embodiment includes a step of comparing the amount of condensed water that can be stored with the amount of condensed water (CV) that is generated per unit time (S115), and a step of, upon determining that the amount of condensed water that can be stored is greater than the amount of condensed water (CV) that is generated per unit time, delaying the operation of the drainage pump 20 (S35).

In a case in which the operation of the drainage pump 20 is delayed, it is possible to maximally fill the condensed water storage part 30 with condensed water. After as large an amount of condensed water as possible is stored in the condensed water storage part 30, the drainage pump 20 may be operated. In this case, it is possible to reduce operating noise and power consumption. The other constructions of this embodiment are similar to those of the sixth embodiment, and therefore a detailed description thereof will be omitted.

Although the first to seventh embodiments have been individually described for the convenience of understanding, the embodiments may be combined, or the components of the respective embodiments may be combined.

According to at least one of the embodiments, it is possible for the water level detecting device to sense the capacitance of condensed water and to more accurately sense the level of the condensed water based on the sensed capacitance.

According to at least one of the embodiments, it is possible to effectively control the drainage pump based on the accurately sensed level of the condensed water, thereby reducing operating noise and power consumption.

According to at least one of the embodiments, it is possible to decide when the drainage pump will be operated based on the accurately sensed level of the condensed water.

According to at least one of the embodiments, it is possible to early operate the drainage pump or to delay the operation of the drainage pump based on the accurately sensed level of the condensed water.

According to at least one of the embodiments, it is possible to early operate the drainage pump or to delay the operation of the drainage pump based on the amount of condensed water that is generated per unit time.

According to at least one of the embodiments, it is possible to increase or decrease the operating interval of the drainage pump based on the amount of condensed water that is generated per unit time.

According to at least one of the embodiments, it is possible to increase the operating interval of the drainage pump in order to reduce operating noise and power consumption.

According to at least one of the embodiments, it is possible to adjust the operating interval of the drainage pump based on the comparison between the amount of condensed water that is generated per unit time and a reference value.

According to at least one of the embodiments, it is possible to compare the amount of condensed water that is generated per unit time with the amount of condensed water that can be stored in order to maximally store condensed water and then drain the stored condensed water.

An air conditioner is capable of sensing the level of condensed water in a state where the sensor does not contact the condensed water. An air conditioner is capable of more accurately detecting the level of condensed water in order to control a drainage pump according to various purposes. An air conditioner is capable of detecting the speed, flow rate, level, etc. of condensed water that is generated per unit time.

In accordance with an aspect of the present disclosure, a method of controlling an air conditioner includes a water level sensing device installed in a condensed water partition wall defining a condensed water storage part, in a state of not contacting condensed water, for sensing capacitance of the condensed water through a plurality of electrode pads, the method including sensing the capacitance of the condensed water through any one of the electrode pads to sense a level of the condensed water during cooling, and operating a drainage pump based on the level of the condensed water sensed through any one of the electrode pads to drain the condensed water stored in the condensed water storage part.

The method may further include, upon determining that the level of the condensed water deviates from an error range of a drainage level, returning to the sensing step.

The method may further include sensing the increase in the level of condensed water during a predetermined time based on the level of the condensed water sensed at the sensing step and calculating the amount of condensed water that is generated per unit time based thereupon, determining whether an operating condition of the drainage pump is satisfied based on the amount of condensed water that is generated per unit time calculated at the calculating step, upon determining at the determining step that the operating condition of the drainage pump is satisfied, operating the drainage pump, and upon determining at the determining step that the operating condition of the drainage pump is not satisfied, returning to the sensing step of sensing the level of the condensed water.

The operating condition of the drainage pump may be decided based on a comparison between the amount of condensed water that is generated per unit time and the amount of condensed water that can be stored.

The operating condition of the drainage pump may be decided based on a comparison between the amount of condensed water that is generated per unit time and a reference value stored in a controller.

The method may further include sensing the increase in the level of condensed water during a predetermined time based on the level of the condensed water sensed at the sensing step and calculating the amount of condensed water that is generated per unit time based thereupon, comparing the amount of condensed water that is generated per unit time with a reference value stored in a controller, and upon determining that the amount of condensed water that is generated per unit time is greater than the reference value, decreasing an operating interval of the drainage pump.

The method may further include sensing the increase in the level of condensed water during a predetermined time based on the level of the condensed water sensed at the sensing step and calculating the amount of condensed water that is generated per unit time based thereupon, comparing the amount of condensed water that is generated per unit time with a reference value stored in a controller, and upon determining that the amount of condensed water that is generated per unit time is less than the reference value, increasing an operating interval of the drainage pump.

The method may further include sensing the increase in the level of condensed water during a predetermined time based on the level of the condensed water sensed at the sensing step and calculating the amount of condensed water that is generated per unit time based thereupon, calculating the amount of condensed water that can be stored based on the level of condensed water stored in the condensed water storage part and comparing the amount of condensed water that is generated per unit time with the amount of condensed water that can be stored, and upon determining at the comparing step that the amount of condensed water that is generated per unit time is greater than the amount of condensed water that can be stored, operating the drainage pump.

The method may further include sensing the increase in the level of condensed water during a predetermined time based on the level of the condensed water sensed at the sensing step and calculating the amount of condensed water that is generated per unit time based thereupon, calculating the amount of condensed water that can be stored based on the level of condensed water stored in the condensed water storage part and comparing the amount of condensed water that is generated per unit time with the amount of condensed water that can be stored, and upon determining at the comparing step that the amount of condensed water that can be stored is greater than the amount of condensed water that is generated per unit time, delaying the operation of the drainage pump.

The method may further include sensing the increase in the level of condensed water during a predetermined time based on the level of the condensed water sensed at the sensing step and calculating the amount of condensed water that is generated per unit time based thereupon, determining whether a dehumidification recommendation condition is satisfied based on the amount of condensed water that is generated per unit time, and upon determining that the dehumidification recommendation condition is satisfied, informing a user thereof.

The informing step may include informing the user that the dehumidification recommendation condition is satisfied through a display unit or a remote controller of an indoor unit of the air conditioner or using sound output from the indoor unit of the air conditioner.

In accordance with another aspect of the present disclosure, there is provided a method of controlling an air conditioner including a water level sensing device installed in a condensed water partition wall defining a condensed water storage part, in a state of not contacting condensed water, for sensing capacitance of the condensed water through a plurality of electrode pads, the method including sensing the capacitance of the condensed water through any one of the electrode pads to sense a level of the condensed water during cooling, sensing the increase in the level of condensed water during a predetermined time based on the level of the condensed water sensed at the sensing step and calculating the amount of condensed water that is generated per unit time based thereupon, and deciding whether the drainage pump will be operated by comparing the amount of condensed water that is generated per unit time with the amount of condensed water that can be stored and/or comparing the amount of condensed water that is generated per unit time with a reference value stored in a controller.

The method may further include, upon determining that the amount of condensed water that is generated per unit time is greater than the reference value, decreasing an operating interval of the drainage pump, and, upon determining that the amount of condensed water that is generated per unit time is less than the reference value, increasing the operating interval of the drainage pump.

The method may further include, upon determining that the amount of condensed water that is generated per unit time is greater than the amount of condensed water that can be stored, operating the drainage pump, and, upon determining that the amount of condensed water that can be stored is greater than the amount of condensed water that is generated per unit time, delaying the operation of the drainage pump.

The method may further include determining whether a dehumidification recommendation condition is satisfied based on the amount of condensed water that is generated per unit time, and upon determining that the dehumidification recommendation condition is satisfied, informing a user thereof.

In accordance with a further aspect of the present disclosure, there is provided an air conditioner including a case having a condensed water storage part formed therein, a condensed water partition wall defining the condensed water storage part, and a water level sensing device installed in the condensed water partition wall, in a state of not contacting condensed water, for sensing a change in capacitance of the condensed water through a plurality of electrode pads.

The water level sensing device may include a water level cover disposed inside the condensed water storage part for preventing the electrode pads from contacting condensed water.

The water level sensing device may include a printed circuit board installed in the condensed water partition wall, the water level sensing device being configured in the form of a printed circuit board assembly (PCBA), a plurality of electrode pads disposed on the printed circuit board such that the electrode pads are spaced apart from each other in a vertical direction, and a connector for electrically connecting the printed circuit board to a controller of the air conditioner.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling an air conditioner including a sensor provided adjacent to a partition wall defining a condensed water storage chamber that stores condensed water the sensor sensing a capacitance of the condensed water through a plurality of electrodes, the method comprising:
    sensing the capacitance of the condensed water through any one of the electrodes to sense a level of the condensed water during a cooling operation of the air conditioner;
    sensing an increase in the level of the condensed water during a predetermined time period based on the sensed level of the condensed water, and calculating an amount of condensed water generated per unit time based on the sensed increase in the level of condensed water; and
    operating a drainage pump based on the amount of condensed water generated per unit time,
    wherein the sensor is provided in the condensed water storage chamber to be at least partially submerged in the condensed water, and
    wherein the sensor includes:
        a printed circuit board provided within the condensed water storage chamber, provided in the partition wall, and having the plurality of electrodes, and
        a water level cover provided in the condensed water storage chamber and assembled to the partition wall to cover the printed circuit board, the water level cover preventing the printed circuit board from physically contacting the condensed water.

2. The method according to claim 1, wherein sensing the level of condensed water is repeated upon determining that the level of the condensed water deviates from a predetermined drainage level range.

3. The method according to claim 1, further comprising:
    determining whether an operating condition of the drainage pump is satisfied based on the amount of condensed water generated per unit time;
    operating the drainage pump upon determining that the operating condition of the drainage pump is satisfied; and
    repeating sensing the level of the condensed water upon determining that the operating condition of the drainage pump is not satisfied.

4. The method according to claim 3, wherein the operating condition of the drainage pump is based on a comparison between the amount of condensed water generated per unit time and an amount of condensed water that can be further stored in the condensed water storage chamber.

5. The method according to claim 3, wherein the operating condition of the drainage pump is based on a comparison between the amount of condensed water generated per unit time and a reference value.

6. The method according to claim 1, further comprising:
comparing the amount of condensed water generated per unit time with a reference value; and
upon determining that the amount of condensed water generated per unit time is greater than the reference value, decreasing an operating interval of the drainage pump.

7. The method according to claim 1, further comprising:
comparing the amount of condensed water generated per unit time with a reference value; and
increasing an operating interval of the drainage pump upon determining that the amount of condensed water generated per unit time is less than the reference value.

8. The method according to claim 1, further comprising:
calculating an amount of condensed water that can further be stored in the condensed water storage chamber based on the sensed level of condensed water currently in the condensed water storage chamber and comparing the amount of condensed water generated per unit time with the amount of condensed water that can be further stored; and
operating the drainage pump upon determining that the amount of condensed water generated per unit time is greater than the amount of condensed water that can be further stored.

9. The method according to claim 1, further comprising:
calculating an amount of condensed water that can further be stored in the condensed water storage chamber based on the sensed level of condensed water currently in the condensed water storage chamber and comparing the amount of condensed water generated per unit time with the amount of condensed water that can be further stored; and
delaying the operation of the drainage pump upon determining that the amount of condensed water that can be stored is greater than the amount of condensed water generated per unit time.

10. The method according to claim 1, further comprising:
determining whether a dehumidification recommendation condition is satisfied based on the amount of condensed water generated per unit time; and
informing a user thereof upon determining that the dehumidification recommendation condition is satisfied.

11. The method according to claim 10, wherein informing the user that the dehumidification recommendation condition is satisfied includes informing the user that the dehumidiciation recommendation condition is satisfied through a display unit or a remote controller of an indoor unit of the air conditioner or sound output from the indoor unit of the air conditioner.

* * * * *